US011985753B2

(12) United States Patent
Ha et al.

(10) Patent No.: US 11,985,753 B2
(45) Date of Patent: May 14, 2024

(54) OVEN

(71) Applicant: LG Electronics Inc., Seoul (KR)

(72) Inventors: Junghyeong Ha, Seoul (KR); Sunghun Sim, Seoul (KR); Yunbyung Chae, Seoul (KR); Chaehyun Baek, Seoul (KR)

(73) Assignee: LG Electronics Inc., Seoul (KR)

( * ) Notice: Subject to any disclaimer, the term of this patent is extended or adjusted under 35 U.S.C. 154(b) by 587 days.

(21) Appl. No.: 17/117,385

(22) Filed: Dec. 10, 2020

(65) Prior Publication Data

US 2021/0352780 A1 Nov. 11, 2021

(30) Foreign Application Priority Data

May 8, 2020 (KR) ........................ 10-2020-0055375

(51) Int. Cl.
*H05B 6/72* (2006.01)
*F24C 7/02* (2006.01)
*F24C 7/06* (2006.01)
*H05B 6/64* (2006.01)
*H05B 6/70* (2006.01)

(52) U.S. Cl.
CPC ................. *H05B 6/72* (2013.01); *F24C 7/02* (2013.01); *F24C 7/06* (2013.01); *H05B 6/6482* (2013.01); *H05B 6/707* (2013.01)

(58) Field of Classification Search
CPC .. H05B 6/6455; H05B 6/6417; H05B 6/6482; F24C 7/085
See application file for complete search history.

(56) References Cited

U.S. PATENT DOCUMENTS

| | | | | |
|---|---|---|---|---|
| 3,152,244 A * | 10/1964 | Ammerman | F24C 7/06 16/335 |
| 5,237,141 A * | 8/1993 | Yoshino | H05B 6/6447 219/709 |
| 5,619,982 A * | 4/1997 | Kelly | F24C 15/2042 126/299 R |
| 6,229,131 B1 * | 5/2001 | Koochaki | H05B 6/6494 426/243 |
| 6,649,890 B1 | 11/2003 | Brinker et al. | |

(Continued)

FOREIGN PATENT DOCUMENTS

| | | |
|---|---|---|
| CN | 110151001 | 8/2019 |
| CN | 110151001 A * | 8/2019 |
| EP | 2597930 | 5/2013 |

OTHER PUBLICATIONS

Extended European Search Report in European Appln. No. 20212725.4, dated May 31, 2021, 8 pages.

*Primary Examiner* — Thien S Tran
(74) *Attorney, Agent, or Firm* — Fish & Richardson P.C.

(57) ABSTRACT

An oven includes a housing that defines a cooking space and that includes an upper frame defining an upper wall that faces the cooking space, a heating unit that is disposed adjacent to the upper frame and configured to transfer heat to the cooking space and that extends along a predetermined pattern to define a closed area, a support member in contact with a plurality of points of the heating unit, and a plurality of antennas disposed at the upper frame and configured to emit, toward the cooking space, radio waves transmitted from a radio wave generator that is electrically connected to an external power source.

17 Claims, 9 Drawing Sheets

(56) References Cited

U.S. PATENT DOCUMENTS

| | | | | |
|---|---|---|---|---|
| 6,933,472 | B1 * | 8/2005 | Smith | F24C 15/325 219/400 |
| 9,967,925 | B2 | 5/2018 | Brill | |
| 10,571,133 | B1 * | 2/2020 | Smith | F24C 7/085 |
| 2005/0230382 | A1 * | 10/2005 | Whipple | F24C 15/325 219/400 |

* cited by examiner

OVEN

CROSS-REFERENCE TO RELATED APPLICATION

Pursuant to 35 U.S.C. § 119(a), this application claims the benefit of the earlier filing date and the right of priority to Korean Patent Application No. 10-2020-0055375, filed on May 8, 2020, the contents of which are incorporated by reference herein in their entirety.

TECHNICAL FIELD

The present disclosure relates to an oven having a heating unit.

BACKGROUND

An oven is a cooking appliance that can cook food using a heat source in an enclosed environment.

For example, ovens may use microwaves, infrared radiation, convection, etc. to cook food.

A microwave oven can cook food using microwaves. In some cases, the microwave oven may have a simple structure and provide ease of use.

In some examples, a microwave oven may have a space that accommodates food, and provide microwaves for heating the food therein. For instance, microwaves generated from an external power source may be transmitted into the space through a waveguide.

The microwave oven may include an electromagnetic wave radiating device provided in the space. The microwaves introduced through the waveguide may be emitted to the space by the electromagnetic wave radiating device. The emitted microwaves may be reflected from (or bounce off) a metal inner wall that surrounds the space, and the microwaves may travel to reach the food. An antenna and the like may be used for the electromagnetic wave radiating device.

A part of the electromagnetic wave radiating device may be connected to the waveguide by a connector, and another part of the electromagnetic wave radiator may be disposed at the inner wall of the space in the oven for achieving a small size, allowing the respective parts thereof to be connected to a ground that is electrically connected to earth (ground).

In some cases, electromagnetic waves at a lower frequency band in relation to an actual length of an electromagnetic wave radiating device may be radiated through the electromagnetic wave radiating device due to the effect of the ground. If the electromagnetic wave radiating device has only one radiating portion from which electromagnetic waves are emitted, it may be implemented as a single frequency band with the maximum radiation efficiency.

Ovens are used for heating various types of food, and an optimal frequency band for heating and cooking food may vary depending on types of cooking ingredients and food.

In some cases, a microwave oven includes a heating element. The heating element includes an inner portion, an outer portion, and a cross-over portion that electrically interconnects the inner and outer portions. The microwave oven may include a waveguide that protrudes to an inside of a cooking space, which may limit an installation space of the heating element. In some cases, interference with a heater may be suppressed or reduced by changing a shape of the heating element, which may make difficult to secure uniform cooking performance.

In some cases, an oven may include one radiating portion. For example, the oven may include an antenna having one end connected to a ground, a middle portion connected to a waveguide, and another end implemented as a radiating portion. If the radiating portion is exposed to an inside of a cooking space, the antenna may be contaminated or damaged by a cooking ingredient (or food).

SUMMARY

The present disclosure describes an oven that defines a cooking space and that includes a heating unit to uniformly or evenly heat the cooking space.

The present disclosure also describes an oven capable of preventing or reducing contamination and damage of antennas located inside a cooking space while suppressing or reducing mutual interference between the antennas having optimal radiation efficiency at a plurality of bands.

According to one aspect of the subject matter described in this application, an oven includes a housing that defines a cooking space and that includes an upper frame defining an upper wall that faces the cooking space, a heating unit that is disposed adjacent to the upper frame and configured to transfer heat to the cooking space and that extends along a predetermined pattern to define a closed area, a support member in contact with a plurality of points of the heating unit, and a plurality of antennas disposed at the upper frame and configured to emit, toward the cooking space, radio waves transmitted from a radio wave generator that is electrically connected to an external power source.

Implementations according to this aspect may include one or more of the following features. For example, the heating unit can be curved or bent. The heating unit can include a first member that extends from a rear part of the upper frame along an outer circumference of the heating unit, and a second member that is disposed inside of the first member and extends from the rear part of the upper frame along the first member, where the second member includes a plurality of portions that are curved or bent.

In some implementations, the heating unit can include a heating unit bracket disposed at the rear part of the upper frame, where the first member can include a first rear portion fitted into the heating unit bracket, and the second member can include a second rear portion fitted into the heating unit bracket. In some examples, the support member extends across the first member and the second member, and is coupled to the first member and the second member.

In some implementations, the support member can include a mounting portion that protrudes upward from one side of the support member to the upper frame, the mounting portion supporting the upper frame. In some examples, the mounting portion can include a plurality of mounting portions that are disposed at a plurality of positions of the support member. In some examples, the plurality of mounting portions can be disposed inward of the first member, and at least a portion of the second member can be disposed between the plurality of mounting portions.

In some implementations, the heating unit can further include a fixing member that extends in one direction and is in contact with at least one of the first member or the second member. In some examples, the fixing member can include a first fixing member that is disposed at rear portions of the first member and the second member and extends in a first horizontal direction, a second fixing member that extends in a second horizontal direction crossing the first horizontal direction and is disposed adjacent to the first fixing member, where the second fixing member connects the first member and the second member to each other. The fixing member can further include a third fixing member that is disposed forward relative to the first fixing member and the second fixing member, where the third fixing member connects one side of the second member to another side of the second member, and a fourth fixing member that extends in the second horizontal direction and is disposed at front portions of the first member and the second member.

In some implementations, the oven can further include a forming part that protrudes upward from the upper frame and accommodates the plurality of antennas therein, where the forming part covers the plurality of antennas from the cooking space. In some examples, the heating unit can be disposed between the forming part and the cooking space. In some examples, the forming part can include a recessed portion that defines an accommodation space receiving the plurality of antennas, and a cover portion that is disposed at the upper frame and covers the recessed portion.

In some implementations, the plurality of antennas can be spaced apart from one another by a predetermined distance. In some examples, the forming part can include a plurality of forming parts that accommodate the plurality of antennas, respectively. In some examples, the recessed portion can be integrally formed with the upper frame. In some examples, the recessed portion can have a rectangular box shape that protrudes upward from the upper frame to define the accommodation space therein having a predetermined depth. In some examples, an outer surface of the cover portion defines at least a portion of the upper frame.

In some implementations, each of the plurality of antennas can include a feeding portion electrically connected to the external power source, a grounding portion electrically connected to a ground, and a radiating portion connected to the feeding portion and the grounding portion and configured to emit the radio waves. In some examples, the radiating portion extends along a lengthwise direction, and can include a plurality of portions that are curved or bent to define a predetermined angle with respect to the lengthwise direction.

In some implementations, the heating unit is spaced apart from the upper wall and disposed inside the cooking space, and the plurality of antennas are disposed vertically above the heating unit.

The fixing member and the support member, which are installed at the heating unit including the first member and the second member, can securely support the heating unit thereby to help to prevent warping of the heating unit. In addition, the cooking space can be evenly or uniformly heated, and a radio wave efficiency can be increased.

In some implementations, the oven includes a plurality of antennas, each having an optimal radiation efficiency at different frequency bands. The antennas can be located inside the respective forming parts, the antennas may not be exposed to the cooking space, and thus contamination and damage of the antennas can be prevented while cooking.

DETAILED DESCRIPTION

Figure 1:
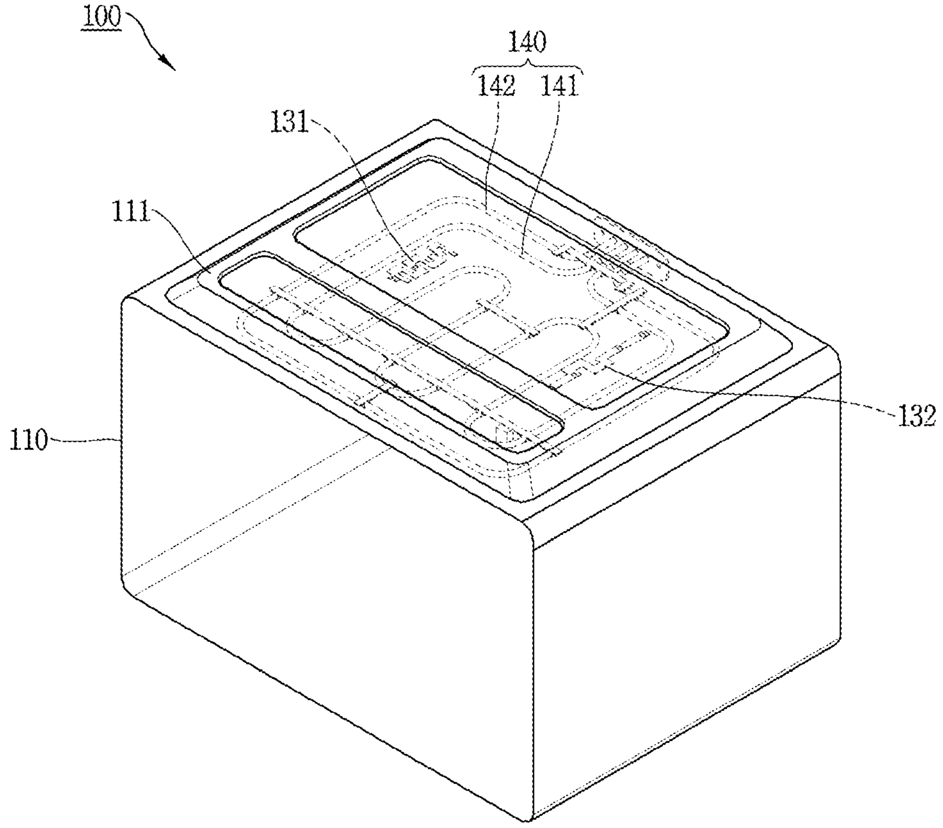
FIG. 1 is a perspective view illustrating an overall structure of an example oven.

Hereinafter, description will be given in more detail of an oven, with reference to the accompanying drawings.

In the following description, the same or similar reference numerals are given to the same or similar components in one or more implementations, and a duplicate description thereof will be omitted.

If a detailed explanation for a related known function or construction diverts the main point of the present disclosure, such explanation has been omitted but would be understood by those skilled in the art.

The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

A singular representation may include a plural representation unless it represents a definitely different meaning from the context.

Figure 2:
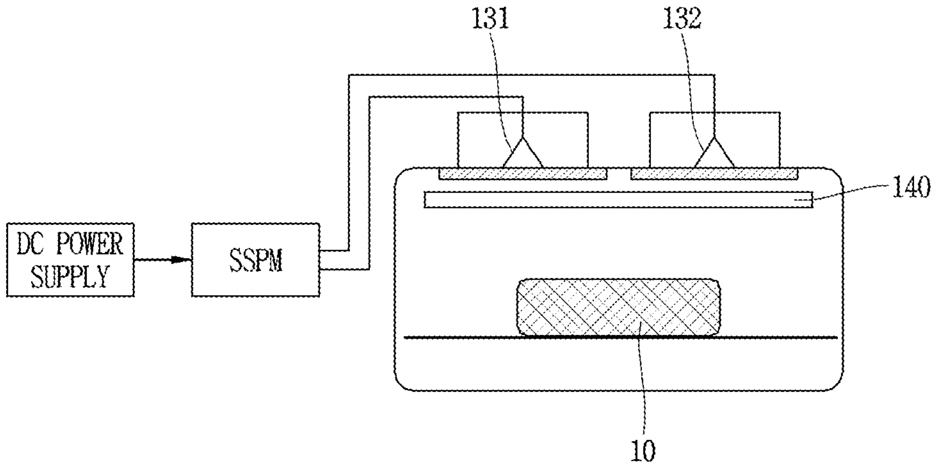
FIG. 2 is a schematic view illustrating an example of an operating principle of the oven.

FIG. 1 is a perspective view illustrating an example of an overall structure of an oven 100, and FIG. 2 is a schematic view illustrating an example of an operating principle of the oven 100.

The oven 100 refers to a cooking appliance that can accommodate food (food item or cooking ingredient) 10 in a space defined therein to heat and cook the food 10. The oven 100 may refer to a complex oven that uses an operating frequency with a cooking speed faster than other types of ovens.

The oven 100 can heat the food 10 using radio waves generated by a radio wave generator and incident on a cooking space S through an antenna 131 and an antenna 132.

In some implementations, the radio waves include electromagnetic waves having frequencies ranging from 3 KHz to 106 MHz, namely the wavelength of infrared rays or greater, such as microwaves.

The oven 100 can include a housing 110 defining an outer appearance, a heating unit 140 that transfers heat to the cooking space S, and the antennas 131 and 132 that transmit radio waves to the cooking space S.

The housing 110 refers to a case defining an outer appearance, and can define the cooking space S for accommodating the food 10 to cook.

The housing 110 has a polyhedral shape with a rectangular cross section, and the food 10 is accommodated therein to be heated.

In some examples, the cooking space S, also referred to as a cavity, can communicate with the outside when a door, installed at the housing 110 is open, so as to allow the food 10 to be accommodated therein.

The housing 110 can be made of an insulating material to suppress radio waves, radiated or emitted from the antennas 131 and 132, from being transmitted to an outside of the housing 110. This can help to prevent accidents such as an electric shock when a user touches the housing 110.

In addition, the housing 110 can be made of a heat-resistant material, so that damage caused by high heat generated in the cooking space S can be reduced or prevented.

The housing 110 can be electrically connected to the outside. The radio wave generator accommodated in the housing 110 can be electrically connected to an external power source.

In some implementations, the housing 110 can include an upper frame 111 defining an upper wall facing an inside of the cooking space S.

The upper frame 111 can define the upper wall inside the cooking space S.

In some examples, the antennas 131 and 132 are coupled to the upper frame 111, and the antennas 131 and 132 are installed at an upper portion of the upper frame 111. Accordingly, the antennas 131 and 132 can radiate or emit radio waves from an upper side of the cooking space S.

The heating unit 140, which is configured to transmit heat to the cooking space S, can be installed at upper and lower parts of the cooking space S to heat the cooking space S. This can allow heat to be evenly transferred to the food 10 accommodated in the cooking space S.

For example, as illustrated in FIG. 1, the heating unit 140 can be fixedly installed at the upper frame 111 to be exposed toward the cooking space S. In some examples, the heating unit 140 can be fixedly installed at an inner lower portion of the housing 110 to be exposed to the cooking space S.

The heating unit 140 can have a specific (or predetermined) shape along the upper frame 111, and be formed in a specific (or predetermined) pattern.

A detailed description of the heating unit 140 will be described later.

The antennas 131 and 132 are installed inside the cooking space S to transmit radio waves generated by the radio wave generator for heating the food 10.

In some example, the radio wave generator can be electrically connected to an external power source in a wired manner by a conducting wire member, and serve to generate radio waves to be incident on the cooking space S via a generator module.

The generator module can receive direct (DC) power, convert the received DC power into the form of radio waves, and adjust intensity, phase, and frequency of the converted waves. For example, the generator module can include a Solid State Power Module (SSPM) having a semiconductor oscillator function.

In some implementations, as illustrated in FIG. 2, in the oven 100, power generated in a DC power supply is supplied to the SSPM, and is converted into the form of radio waves, allowing the radio waves to be transmitted to the cooking space S by the antennas 131 and 132 connected to the SSPM.

The antennas 131 and 132 are installed at one side of the upper frame 111 so as to emit radio waves, received from the radio wave generator in electrical connection to an external power source for radio wave generation, toward the cooking space S.

Intensity, phase, and frequency of radio waves generated in the radio wave generator can be adjusted and transmitted by the antennas 131 and 132.

In some implementations, a plurality of antennas 131 and 132 can be physically spaced apart from each other.

As the antennas 131 and 132 emit radio waves toward the cooking space S from different locations, the radio waves can be incident on the food 10 accommodated in the cooking space S from various locations, allowing the food 10 to be heated more quickly and effectively.

The antennas 131 and 132 can be implemented as a first antenna 131 and a second antenna 132 installed at different locations (or positions). The number of antennas can vary in other implementations. In some examples, where more than two antennas are provided, the antennas can be spaced apart from one another.

The antennas 131 and 132 can be spaced apart from each other. As radios waves, emitted by the antennas 131 and 132, are incident on the cooking space S from different locations, the antennas 131 and 132 can receive radio waves reflected from (or bounce off) an inside of the cooking space S.

In some implementations, a forming part 121 and a forming part 122 can be disposed at the upper frame 111 defining the upper wall of the cooking space S. This can help to suppress radio waves emitted from one antenna from being incident on another antenna, namely radio waves emitted from the antenna 131 may not be incident on the antenna 132, and radio waves emitted from the antenna 132 may not be incident on the antenna 131.

In some examples, the forming parts 121 and 122 can protrude upward from one side of the upper frame 111 so as to accommodate the antennas 131 and 132 therein, respectively. This can help to prevent the antennas 131 and 132 from being exposed to the cooking space S. A detailed description thereof will be described hereinafter.

Figure 3:
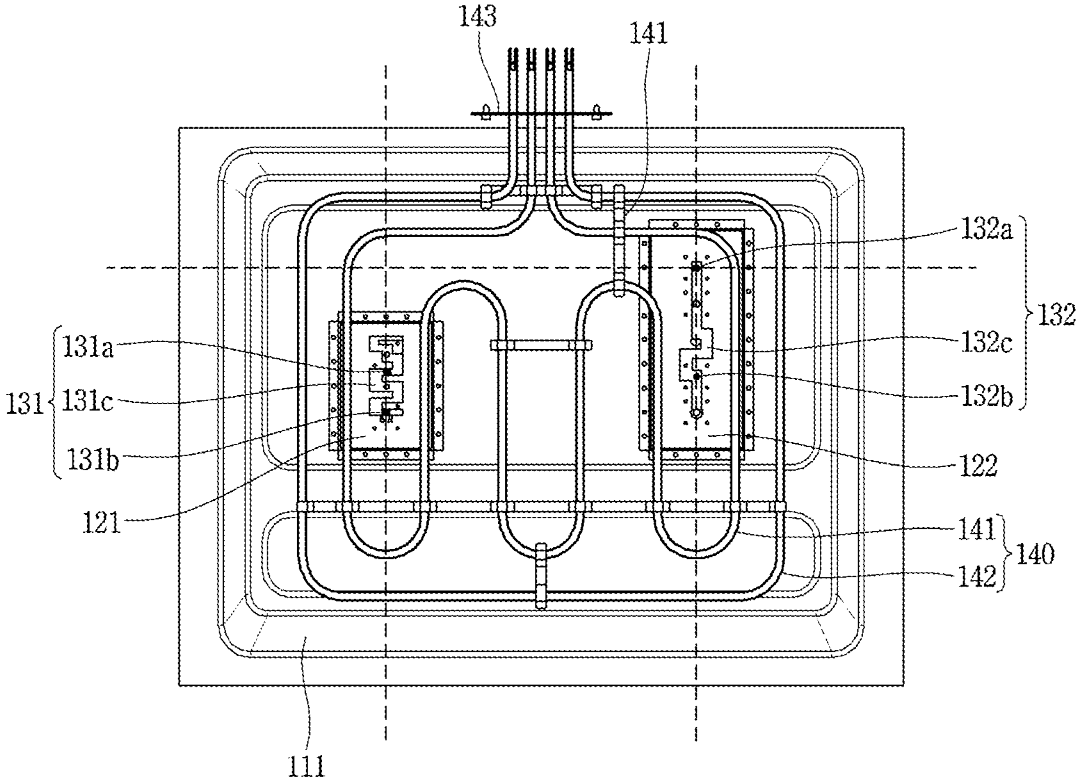
FIG. 3 is a schematic view illustrating an example of an upper part of a cooking space of the oven.
Figure 4:
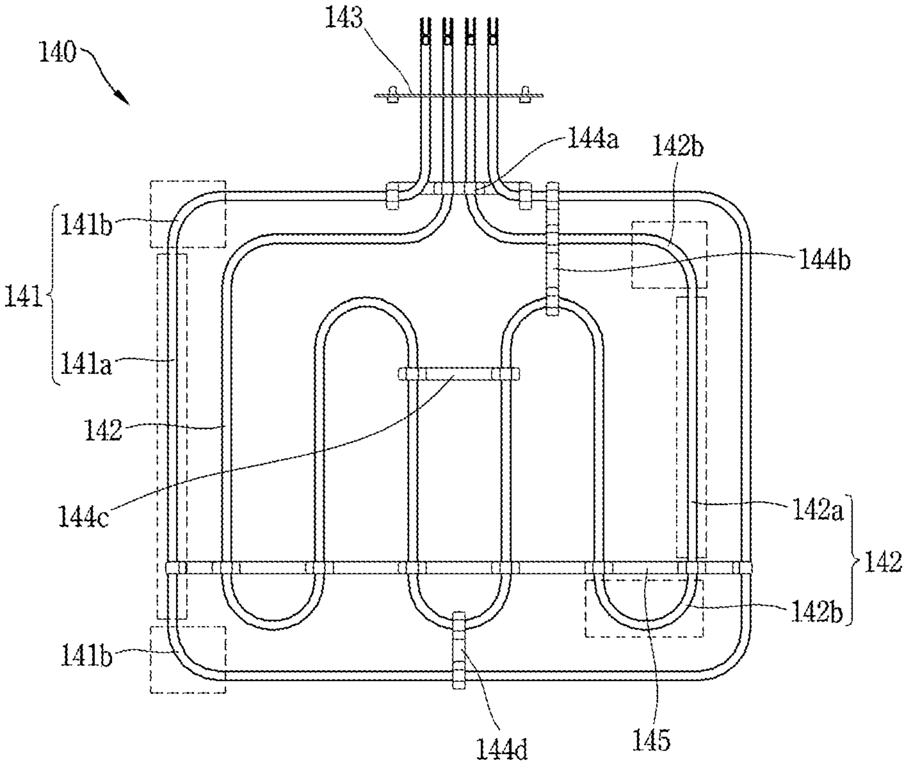
FIG. 4 is a planar view of an example of a heating unit.
Figure 5:
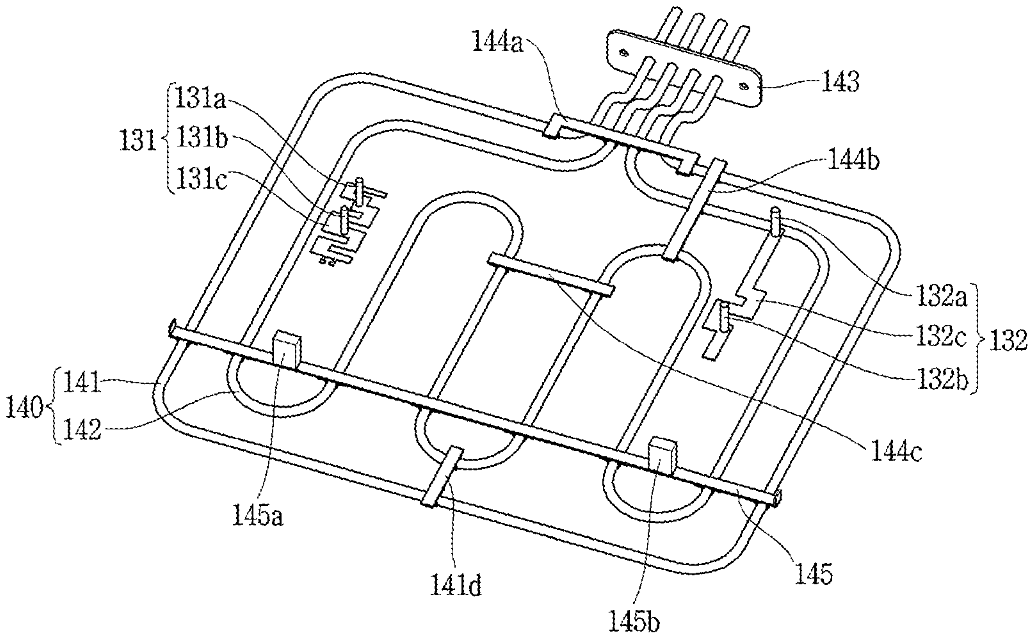
FIG. 5 is a schematic view illustrating examples of a heating unit and an antenna installed inside the cooking space.
Figure 6:
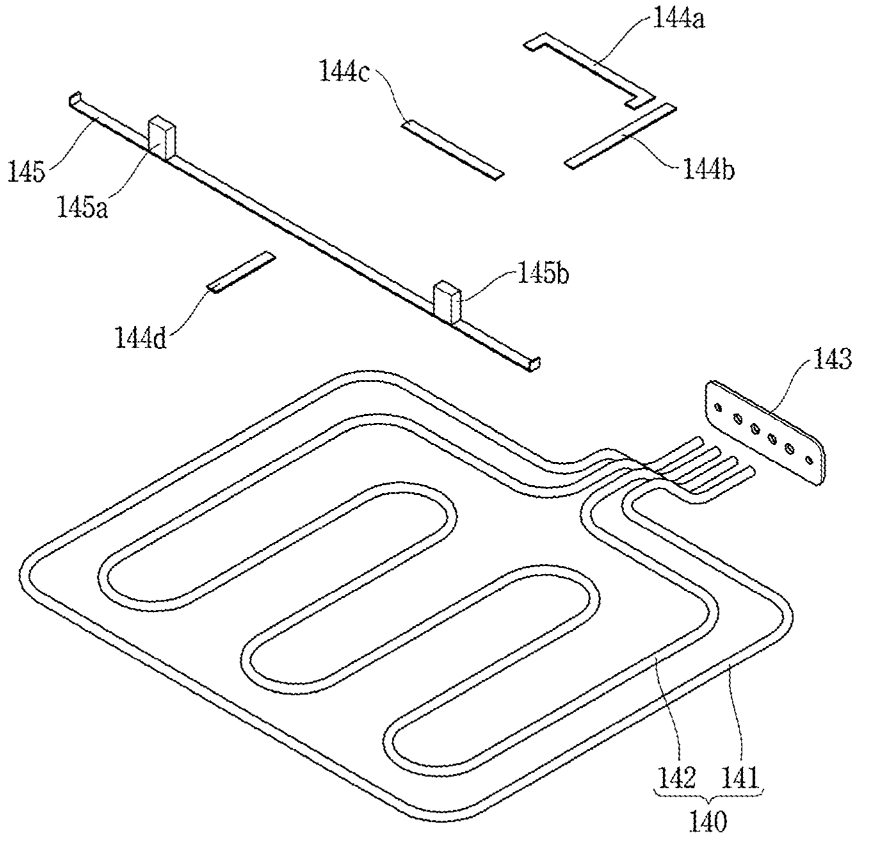
FIG. 6 is an exploded perspective view of the heating unit.

FIG. 3 is a schematic view illustrating an example of an upper part of the cooking space S. FIG. 4 is a planar view of an example of the heating unit 140. FIG. 5 is a schematic view illustrating the heating unit 140 and the antennas 131 and 132 installed inside the cooking space S. FIG. 6 is an exploded perspective view of the heating unit 140.

The antennas 131 and 132 can be coupled and installed to the upper frame 111. Accordingly, the antennas 131 and 132 can emit radio waves to the food 10 from the upper side of the cooking space S.

The heating unit 140, configured to transfer heat to the cooking space S, can be fixed to the upper frame 111 and installed inside the cooking space S.

The heating unit 140 is located inner than the forming parts 121 and 122 with respect to the cooking space S.

The heating unit 140 configured to heat the cooking space S can have a shape that allows heat to be evenly distributed throughout an entire area of the upper frame 111, so that heat is uniformly transferred to the food 10 accommodated in the cooking space S. The heating unit 140 can include a wire or a curved bar.

For example, the heating unit 140 can include a first member 141 and a second member 142 extending from a position adjacent to the upper frame 111 so as to form a closed area. A support member 145 can be installed at the heating unit 140 to be in contact with the first member 141 and the second member 142 at a plurality of points.

The heating unit 140 can have a specific heating pattern formed by the first member 141 and the second member 142.

In some examples, the first member 141 extends from a rear part of the upper frame 111 along an outer circumference.

The second member 142 can be located at an inside of the first member 141 and be curved or bent at a plurality of points.

In some implementations, the first member 141 and the second member 142 can be made of a metal material having a circular cross section, and extend to form a specific heating pattern.

The first member 141 and the second member 142 are designed to cover an area of the upper frame 111 entirely, thereby ensuring uniform load heating and heating efficiency.

In some examples, the first member 141 extends from the rear part of the upper frame 111 along the outer circumference so as to define a specific closed area.

In the same or other examples, the second member 142 extends from the rear part of the upper frame 111 and have a shape curved or bent at a plurality of points at an inner side of the first member 141. This shape of the second member 142 ensures uniform cooking performance while cooking the food 10.

The second member 142 can include an extended portion 142*a* extending in one direction and a curved portion 142*b* that is curved or bent at a specific or predetermined curvature. The second member 142 can have a shape curved or bent at the plurality of points by the curved portion 142*b* and form the closed area.

The first member 141 and the second member 142 are configured to receive power from a power supply unit installed at one end of rear portions thereof, so as to be heated by the supplied power to emit heat.

The first member 141 and the second member 142 can be configured such that the rear portions thereof are fixed by a heating unit bracket 143. The heating unit bracket 143 can be fixedly installed at a rear portion of the housing 110. As illustrated in FIG. 5, the heating unit bracket 143 can be located at the front of the power supply unit installed at one end of the rear portions of the first member 141 and the second member 142.

The heating unit bracket 143 can be made of a metal material having a rectangular shape, and serve to support the first member 141 and the second member 142. The heating unit bracket 143 can be installed at a rear portion of the upper frame 111 in a direction crossing an extended direction of the first member 141 and the second member 142.

In some example, the rear portions of the first member 141 and the second member 142 can be fixed to the heating unit bracket 143 in a manner of being fitted into holes formed in the heating unit bracket 143.

The first member 141 and the second member 142 are fixed to each other at a plurality of points by fixing members 144*a*, 144*b*, 144*c*, and 144*d*. The fixing members 144*a*, 144*b*, 144*c*, and 144*d* are installed at a plurality of different positions to support the heating unit 140 and thereby to prevent warping or distortion of the heating unit 140.

In some examples, the fixing members 144*a*, 144*b*, 144*c*, and 144*d* extend in one direction, respectively, so as to be installed to be in contact with the first member 141 or the second member 142 at the plurality of points. For example, each fixing member can have a bar shape or a plate shape extending in a horizontal direction.

The fixing members 144*a*, 144*b*, 144*c*, 144*d* and the heating unit 140 can be joined together by welding or the like, so as to lower electrical resistance, which prevents the first member 141 and the second member 142 constructing the heating unit 140 from being heated by energy of radio waves emitted from the antennas 131 and 132.

The fixing members 144*a*, 144*b*, 144*c*, and 144*d* can be fixedly installed to the heating unit 140 by welding using a separate clip-shaped member, so as to maximize surface resistance.

The fixing members 144*a*, 144*b*, 144*c*, and 144*d* can be provided in plurality, and installed at a plurality of left and right sides of the heating unit 140 in an asymmetrical manner. Such arrangement of the fixing members 144*a*, 144*b*, 144*c*, and 144*d* allows a heating pattern of RF energy at each frequency of radio waves radiated from the antennas 131 and 132 to vary. Accordingly, a uniform heating result can be achieved or obtained by adjusting or changing frequencies emitted by the antennas in real time.

More specifically, the fixing members 144*a*, 144*b*, 144*c*, and 144*d* can be implemented as a first fixing member 144*a*, a second fixing member 144*b*, a third fixing member 144*c*, and a fourth fixing member 144*d*.

The first to fourth fixing members 144*a*, 144*b*, 144*c*, and 144*d* can be made of a metal material, and can be fixedly installed at one side of the heating unit 140 by welding.

The first fixing member 144*a* can have a shape of a bar extending in one direction and be installed at the rear portions of the first member 141 and the second member 142 in a horizontal direction. The first fixing member 144*a* can be located at the front of the heating unit bracket 143. As the first fixing member 144*a* is horizontally installed, the first fixing member 144*a* can be in contact with both the first member 141 and the second member 142. The first fixing member 144*a* serves not only to secure heating performance of the antennas 131 and 132, but also to support the heating unit 140 for preventing warping.

The second fixing member 144*b* has a shape of bar extending in one direction and is installed at a position adjacent to the first fixing member 144*a*. The second fixing member 144*b* can be installed in a vertical direction that intersects the first fixing member 144*a*, so as to be in contact with both the first member 141 and the second member 142.

For example, as illustrated in FIG. 4, the second fixing member 144*b* is located at the front of the first fixing member 144*a*. In some implementations, the second fixing member 144*b* can be installed at a direction crossing a right front side with respect to the first fixing member 144*a*. However, this is just one example, and the second fixing member 144*b* can be installed at a front left side with respect to the first fixing member 144*a* in consideration of performance of the antennas 131 and 132. The second fixing member 144*b* can be fixedly installed to one side of the first member 141 and the second member 142, so as to secure heating performance of the antennas 131 and 132 and support the heating unit 140 for warping prevention.

The third fixing member 144*c* can be provided to connect one side and another side of the second member 142. The third fixing member 144*c*, which is installed at a central part of the heating unit 140, can be coupled to two adjacent extended portions 142*a* of the second member 142. The third fixing member 144*c* can be installed to be located forward than two curved or bent portions 142*b* located at the rear portion of the second member 142.

The third fixing member 144*c* is fixedly installed to the second member 142 to secure heating performance of the antennas 131 and 132 and support the heating unit 140 to thereby prevent warping of the heating unit 140, especially the second member 142.

The fourth fixing member 144*d* can be installed at front portions of the first member 141 and the second member 142 in the vertical direction. The fourth fixing member 144*d* is vertically installed and fixed to one side of the first member 141 and one side of the second member 142 at a front part of the heating unit 140, thereby securing heating performance of the antennas 131 and 132 and preventing warping by supporting the heating unit 140.

The fourth fixing member 144*d* is located at the front of the third fixing member 144*c* and can be installed in a direction crossing the third fixing member 144*c*.

The support member 145 can be installed at the heating unit 140 to be in contact with the first member 141 and the second member 142 at a plurality of points. Accordingly, the first member 141 and the second member 142 can be supported by the support member 145.

The support member 145 can have a shape of a bar extending in one direction, and can be horizontally installed to be directed from a left end to a right end of the heating unit 140

The support member 145 is installed to be located rearward (behind) than the fourth fixing member 144*d*. The support member 145 can be installed to be located between the third fixing member 144*c* and the fourth fixing member 144*d*.

In some implementations, the support member 145 extends in the horizontal direction crossing the first member 141 and the second member 142. The support member 145 can be coupled to both the first member 141 and the second member 142.

Mounting portions 145*a* and 145*b* protruding upward can be coupled to one side of the support member 145, so as to support the upper frame 111.

The mounting portions 145*a* and 145*b* can be formed in a rectangular cuboid (or parallelepiped) shape, and upper surfaces thereof can be fixedly installed to the upper frame 111. The mounting portions 145*a* and 145*b* can allow the support member 145 to be supported on the upper frame 111.

The mounting portions 145*a* and 145*b* can be made of a metal material so as to be in contact with the upper frame 111 to make a ground connection.

The mounting portions 145*a* and 145*b* can be coupled to the upper frame 111 to serve as earthing or grounding (GND).

As the mounting portions 145*a* and 145*b* are provided in plurality, the mounting portions 145*a* and 145*b* can be installed at a plurality of points (or positions) of the support member 145.

As illustrated in FIG. 5, the mounting portions 145*a* and 145*b* can be installed on the support member 145 at positions that intersect virtual vertical lines each connecting the feeding portion 131*a* and the grounding portion 131*b* 132*b* of the antenna 131, and the feeding portion 132*a* and the grounding portion 132*b* of the antenna 132.

As the ground connection is made through the mounting portions 145*a* and 145*b* of the support member 145, a maximum temperature at each frequency of the first antenna 131 and the second antenna 132 can be reduced, thereby preventing or reducing degradation or deterioration of frequency performance. Specific details thereof will be described hereinafter.

In addition, the plurality of antennas 131 and 132 can be installed at the upper frame 111 defining the upper wall of the cooking space S.

In some implementations, as illustrated in FIG. 3, each of the antennas 131 and 132 can be located inside the closed area formed by the heating unit 140.

The antennas 131 and 132 can be configured as the first antenna 131 and the second antenna 132 that are installed at different locations to be spaced apart from each other by a predetermined distance.

The antennas 131 and 132 are located at the respective forming parts 121 and 122 provided at the upper frame 111. This can help to suppress radio waves emitted from one antenna from being incident on another antenna, namely radio waves emitted from the antenna 131 may not be incident on the antenna 132, and vice versa.

The forming parts 121 and 122 can be implemented as a first forming part 121 at which the first antenna 131 is located, and a second forming part 122 at which the second antenna 132 is disposed.

The antennas 131 and 132 allow radio waves generated and adjusted by the generator module configured as an SSPM to be incident toward the cooking space S.

The antenna 131 and the antenna 132 can respectively include a feeding portion 131*a* and a feeding portion 132*a* connected to the radio wave generator, a grounding portion 131*b* and a grounding portion 132*b* connected to a ground, and a radiating portion 131*c* and a radiating portion 132*c*.

The feeding portions 131*a* and 132*a* can be implemented as a connector configured to transmit radio waves generated in the radio wave generator.

The feeding portions 131*a* and 132*a* can have a cylindrical shape extending in a vertical (or up-and-down) direction.

An electrical connection member coupled to a waveguide extending from the radio wave generator can be provided in each of a hollow body of the feeding portions 131*a* and 132*a*. The electrical connection member can be made of a copper or brass material.

The grounding portions 131*b* and 132*b* connected to the ground can be formed in a cylindrical shape extending in the vertical direction. As the grounding portions 131*b* and 132*b* of the antennas 131 and 132 are connected to the ground, radio waves at a low frequency band can be efficiently radiated. Accordingly, radio waves with a relatively low frequency range can be emitted in a manner of optimal efficiency, achieving a small size of the antennas 131 and 132.

In addition, when the antennas 131 and 132 are implemented as the first antenna 131 and the second antenna 132, each of the grounding portions 131*b* and 132*b* is electrically connected to the ground.

An electrical connection member coupled to a ground terminal can be provided in a hollow body of the grounding portions 131*b* and 132*b*. The electrical connection member can be made of a copper or brass material.

A vertically extended length of the feeding portions 131*a* and 132*a* can be less (or shorter) than a vertically extended length of the grounding portions 131*b* and 132*b*.

The radiating portions 131*c* and 132*c* are configured to emit radio waves by connecting the respective feeding portions 131*a* and 132*a* and the respective grounding portions 131*b* and 132*b*. Each of the radiating portions 131*c* and 132*c* has a shape that is vertically longer than horizontally wide, and is made of a material having excellent electrical conductivity. For example, the radiating portions 131*c* and 132*c* can be made of any one of aluminum (Al), gold (Au), silver (Ag), and copper (Cu).

A total length of the radiating portions 131*c* and 132*c* can vary depending on a frequency of radio wave radiated, and when radio waves in a frequency band that does not match a total length of the radiating portions 131*c* and/or 132*c* are emitted therethrough, radiation efficiency can be reduced. In some example, the total lengths of the radiating portions 131*c* and 132*c* can be determined according to shapes extended and curved or bent between the grounding portion 131*b* and the feeding portion 131*a*, and between the grounding portion 132*b* and the feeding portion 132*a*, respectively.

Figure 7:
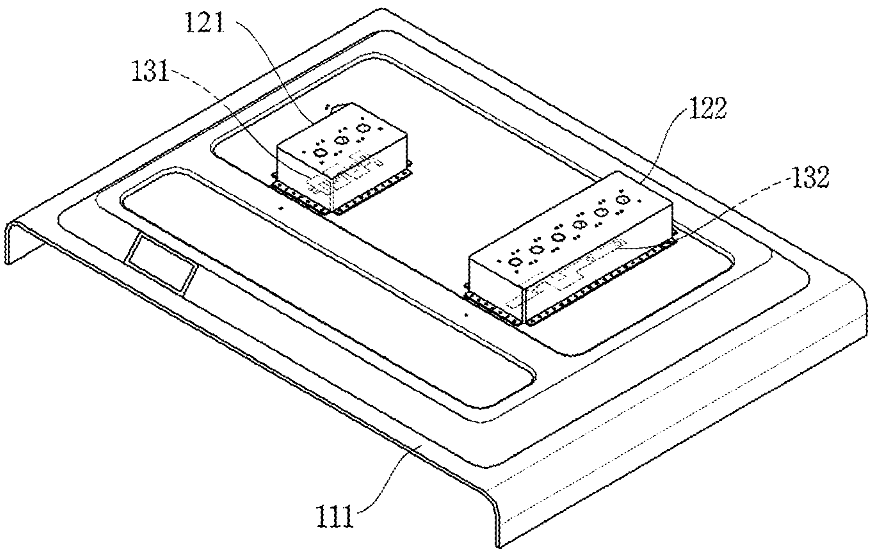
FIG. 7 is a perspective view of an example of an upper frame of the oven.
Figure 8:
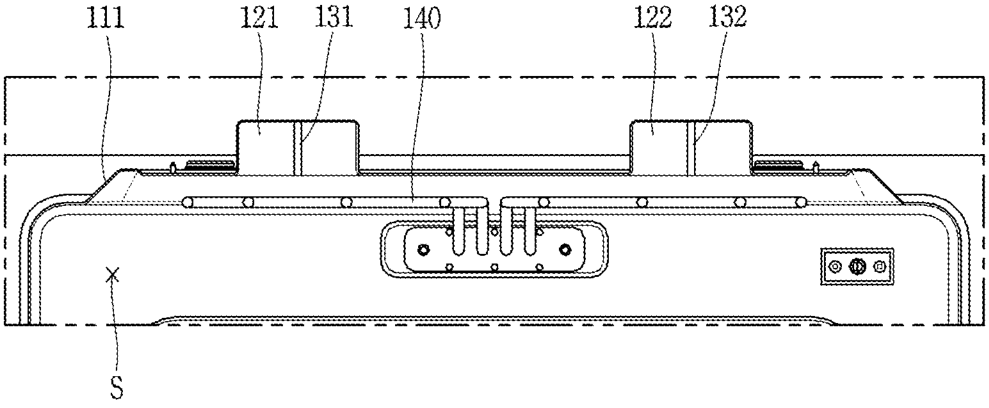
FIG. 8 is a cross-sectional view of the upper frame.

FIG. 7 is a perspective view of the upper frame 111, and FIG. 8 is a cross-sectional view of the upper frame 111.

The antennas 131 and 132 can be installed at the upper frame 111 located inside the cooking space S. Accordingly, the antennas 131 and 132 can emit radio waves from the upper side of the cooking space S, so as to allow the food 10 to be cooked.

In some cases, where the antennas 131 and 132 are installed at the upper part of the cooking space S, contamination and damage to the antennas 131 and 132 may occur due to high heat generated by the heating unit 140 installed adjacent to the antennas 131 and 132, and the food 10 heated and cooked in the cooking space S.

In order to prevent or reduce contamination and damage to the antennas 131 and 132, in some implementations, the oven 100 can include the forming parts 121 and 122 that are provided at one side of the upper frame 111 and accommodate the antennas 131 and 132 therein, respectively. For example, the forming parts 121 and 122 can be protrusions that protrude from an upper surface of the upper frame 111.

In some implementations, the forming parts 121 and 122 protrude upward from the one side of the upper frame 111. As the antennas 131 and 132 are accommodated in the forming parts 121 and 122, the antennas 131 and 132 may not be exposed to the cooking space S.

The forming parts 121 and 122 can respectively include a recessed portion 121*a* and a recessed portion 122*a*, and a covering portion 121*b* and a covering portion 122*b*.

The recessed portions 121*a* and 122*a* are recessed upward to form a specific accommodation space, so as to allow the antennas 131 and 132 to be located at the one side of the upper frame 111.

The recessed portions 121*a* and 122*a* can be integrally formed with the upper frame 111, and be recessed in a rectangular shape to have a predetermined depth.

In some example, the depth of the recessed portions 121*a* and 122*a* can be approximately λ/9 to λ/10. Here, "λ" denotes a wavelength value obtained through frequencies emitted by the antennas 131 and 132, and the recessed portions 121*a* and 122*a* can have a depth of approximately 30 to 40 mm at a frequency of 915 MHz.

In addition, a length of the recessed portions 121*a* and 122*a* can be approximately λ/2 such that emission of the antennas 131 and 132 is smoothly performed, and a left and right (or horizontal) width of the recessed portions 121*a* and 122*a* can be approximately 10 mm or more such that at least a part of the heating unit 140 vertically overlaps the recessed portions 121*a* and 122*a*.

Likewise, "λ" denotes a wavelength value obtained through frequencies radiated by the antennas 131 and 132.

In some implementations, the recessed portions 121*a* and 122*a* extend upward or are recessed upward from the cooking space S to form the specific accommodation space, so as to allow the antennas 131 and 132 to be installed at the recessed portions 121*a* and 122*a*.

As the antennas 131 and 132 are located in the accommodation space of the recessed portions 121*a* and 122*a*, the antennas 131 and 132 may not protrude to the cooking space S.

The cover portions 121*b* and 122*b* can have a specific or predetermined metal plate shape, and be installed to cover the recessed portions 121*a* and 122*a*, respectively. The cover portions 121*b* and 122*b* can have the shape that corresponds to the shape of the recessed portions 121*a* and 122*a*.

The cover portions 121*b* and 122*b* serve to limit external exposure of the antennas 131 and 132 located in the accommodation space of the recessed portions 121*a* and 122*a*. The cover portions 121*b* and 122*b* can be fixedly installed at a bottom part of the upper frame 111 so as to cover the recessed portions 121*a* and 122*a*.

In some example, the cover portions 121*b* and 122*b* are installed at the upper frame 111 in a manner of not protruding toward the cooking space S, so that outer surfaces of the cover portions 121*b* and 122*b* disposed toward the cooking space S can form the same plane as the upper frame 111.

In addition, the cover portions 121*b* and 122*b* can be made of an opaque material so as to limit or restrict transmittance of the antennas 131 and 132 accommodated in the recessed portions 121*a* and 122*a*. This can help to prevent the antennas 131 and 132 accommodated in the respective forming parts 121 and 122 from protruding to the cooking space S, and achieve an oven structure with a sense of unity, as the antennas 131 and 132 are invisible owing to opacity of the cover portions 121*b* and 122*b*.

In some implementations, the plurality of the forming parts 121 and 122 can accommodate the antennas 131 and 132 therein, respectively.

For example, each of the forming parts 121 and 122 can define the accommodation space that is recessed upward from the cooking space S in a manner of corresponding to the overall shape of the antennas 131 and 132, so as to receive the respective antennas 131 and 132 therein. As the antennas 131 and 132 are located at the respective forming parts 121 and 122, the antennas 131 and 132 may not protrude toward the inside of the cooking space S. In addition, as a separate wall is formed between the antennas 131 and 132 by the forming parts 121 and 122, mutual interference between the antennas 131 and 132 can be prevented or reduced. For example, when the antennas 131 and 132 protrude toward the cooking space S, a mutual coupling between the antenna 131 and the antenna 132 can be −2 to −3 dB, whereas when the antennas 131 and 132 are located at the respective forming parts 121 and 122, the mutual coupling between the antenna 131 and the antenna 132 can be reduced by −6 to −8 dB.

Figure 9A:
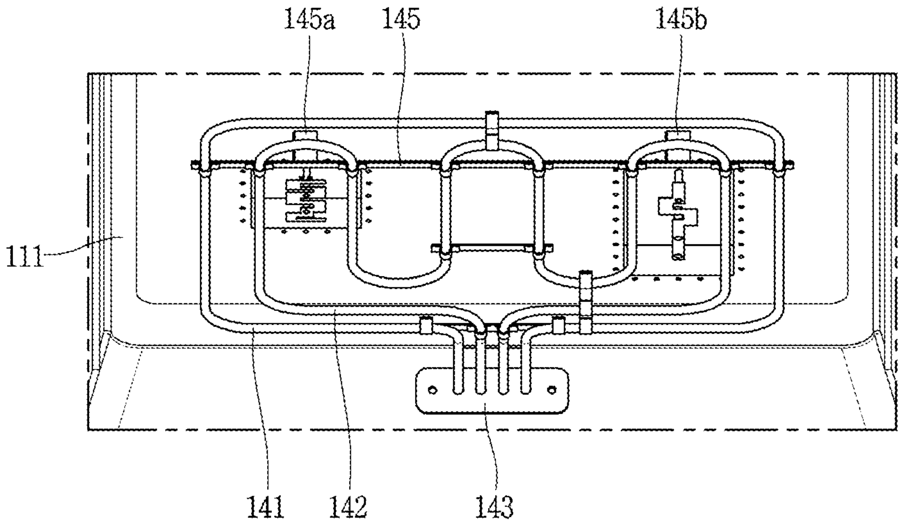
FIGS. 9A and 9B are diagrams of an example of an inside of the cooking space, respectively illustrating a mounting portion installed on an example support member.
Figure 9B:
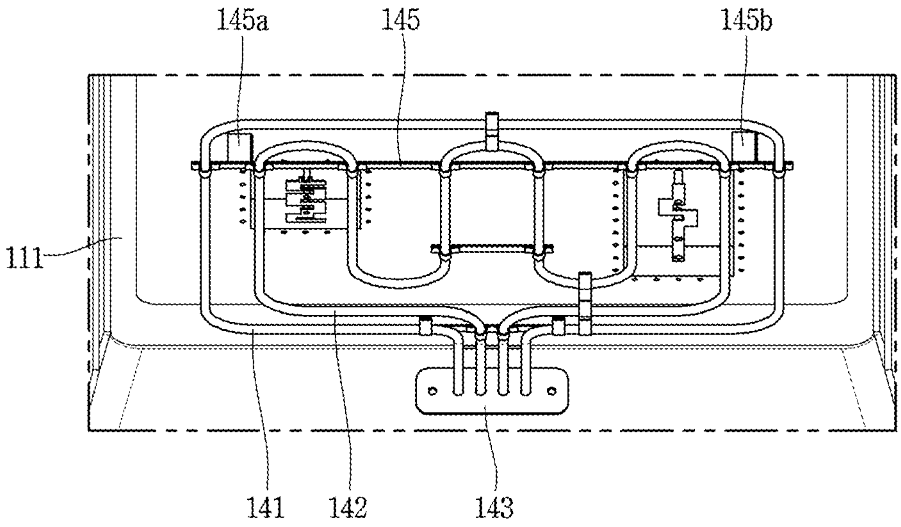

FIGS. 9A and 9B are views of an inside of the cooking space S, respectively illustrating a state in which the mounting portions 145*a* and 145*b* are installed on the support member 145.

Figure 10:
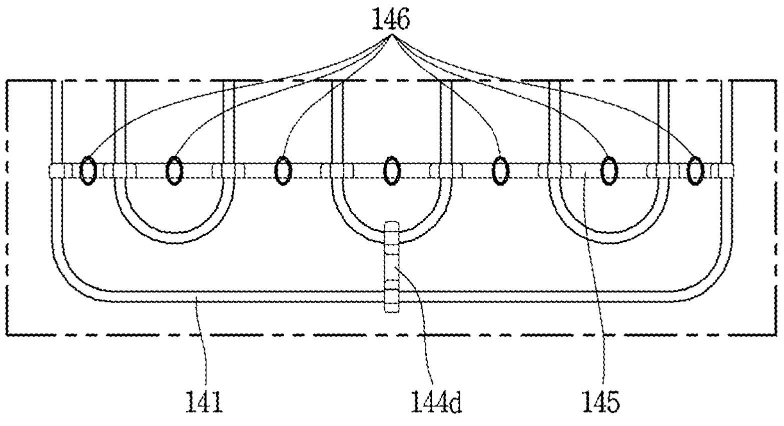
FIG. 10 is a schematic view illustrating an example position of the mounting portion installed on the support member.

FIG. 10 is a schematic view illustrating positions of the mounting portions 145*a* and 145*b* installed on the support member 145.

In some examples, where the plurality of mounting portions 145*a* and 145*b* are provided, the mounting portions 145*a* and 145*b* can be installed at a plurality of positions of the support member 145. For example, the mounting portions 145*a* and 145*b* can be installed at positions that do not overlap the first member 141 and the second member 142.

In some cases, the mounting portions 145*a* and 145*b* can be disposed inward of the first member 141, and at least a portion of the second member 142 can be disposed between the mounting portions 145*a* and 145*b*. In some cases, each of the mounting portions 145*a* and 145*b* can be disposed between adjacent straight portions of the second member 142. In some cases, each of the mounting portions 145*a* and 145*b* can be disposed between a straight portion of the first member 141 and a straight portion of the second member 142 adjacent and facing the straight portion of the first member 141.

As illustrated in FIG. 9A, the mounting portions 145*a* and 145*b* can be installed on the support member 145 at positions that intersect virtual vertical lines each connecting the feeding portion 131*a* and the grounding portion 131*b* of the antenna 131, and the feeding portion 131*a* and the grounding portion 132*b* of the antenna 132.

As the grounding connection is made through the mounting portions 145*a* and 145*b* of the support member 145, a maximum temperature at each frequency of the first antenna 131 and the second antenna 132 can be reduced, thereby preventing degradation of frequency performance.

According to a result of measuring a maximum temperature of the first antenna 131 and the second antenna 132 at each frequency, the maximum temperature at each operating frequency of the first antenna 131 and the second antenna 132 was reduced when installing the mounting portions 145*a* and 145*b* on the support member 145 at positions that intersect the respective vertical lines of the antennas 131 and 132.

For example, the first antenna 131 was found to have a maximum temperature of 44.5° C. at 902 MHz, a maximum temperature of 38.3° C. at 914 MHz, and a maximum temperature of 72.2° C. at 924 MHz.

In addition, the second antenna 132 was found to have a maximum temperature of 38.6° C. at 908 MHz, a maximum temperature of 45.4° C. at 914 MHz, and a maximum temperature of 48.6° C. at 922 MHz.

As illustrated in FIG. 9B, the mounting portions 145*a* and 145*b* can be installed on the support member 145 at positions that do not overlap the virtual vertical lines, namely out of the virtual vertical lines each connecting the feeding portion 131*a* and the grounding portion 131*b* of the antenna 131, and the feeding portion 132*a* and the grounding portion 132*b* of the antenna 132.

For example, the mounting portions 145*a* and 145*b* can be installed at left and right ends of the support member 145, respectively, out of the virtual vertical lines each connecting the feeding portion 131*a* and the grounding portion 131*b* of the antenna 131, and the feeding portion 132*a* and the grounding portion 132*b* of the antenna 132.

As the grounding connection is made through the mounting portions 145*a* and 145*b* of the support member 145, a maximum temperature at each frequency of the first antenna 131 and the second antenna 132 can be reduced, thereby preventing degradation of the frequency performance.

According to a result of measuring a maximum temperature of the first antenna 131 and the second antenna 132 at each frequency, the maximum temperature at each operating frequency of the first antenna 131 and the second antenna 132 was reduced when installing the mounting portions 145*a* and 145*b* at the left end and the right end of the support member 145, respectively, out of the vertical lines of the antennas 131 and 132.

For example, the first antenna 131 was found to have a maximum temperature of 43.5° C. at 905 MHz, a maximum temperature of 48.7° C. at 909 MHz, and a maximum temperature of 52.2° C. at 921 MHz.

In addition, the second antenna 132 was found to have a maximum temperature of 58.2° C. at 906 MHz, a maximum temperature of 53.2° C. at 910 MHz, and a maximum temperature of 52.1° C. at 921 MHz.

Further, the mounting portions 145*a* and 145*b* can be respectively provided in plurality so as to be installed at a plurality of points 146 of the support member 145.

For example, as illustrated in FIG. 10, the mounting portions 145*a* and 145*b* may be installed on the support member 145 at various positions (or locations), and the mounting portions 145*a* and 145*b* may be provided at least more than two points of the support member 145. In some example, each of the mounting portions 145*a* and 145*b* can be installed at a position that does not overlap the first member 141 and the second member 142. This can enable the mounting portions 145*a* and 145*b* to be more securely supported on the upper frame 111.

The foregoing implementations are merely illustrative to practice the oven. Therefore, the present disclosure is not limited to the above-described implementations, and it will be understood by those of ordinary skill in the art that various changes in form and details may be made therein without departing from the scope of the present disclosure.

What is claimed is:

1. An oven comprising:
- a housing that defines a cooking space, the housing comprising an upper frame that defines an upper wall facing the cooking space;
- a heating unit disposed adjacent to the upper frame and configured to transfer heat to the cooking space, the heating unit extending along a predetermined pattern that defines a closed area;
- a support member in contact with a plurality of points of the heating unit;
- a plurality of antennas disposed at the upper frame and configured to emit, toward the cooking space, radio waves transmitted from a radio wave generator that is electrically connected to an external power source; and
- a mounting portion protruding from a first side of the support member toward the upper frame, connecting the support member to the upper frame, and made of a metal material, wherein each of the plurality of antennas comprises:
- a feeding portion electrically connected to the external power source,
- a grounding portion electrically connected to a ground, and
- a radiating portion connected to the feeding portion and the grounding portion and configured to emit the radio waves, and wherein the mounting portion includes a plurality of mounting portions that are disposed at the support member at positions that intersect virtual vertical lines each connecting the feeding portion and the grounding portion of the antenna.

2. The oven of claim 1, wherein the heating unit is curved or bent, and comprises:
- a first member that extends from a rear part of the upper frame along an outer circumference of the heating unit; and
- a second member that is disposed inside of the first member and extends from the rear part of the upper frame along the first member, the second member comprising a plurality of portions that are curved or bent.

3. The oven of claim 2, wherein the heating unit comprises a heating unit bracket disposed at the rear part of the upper frame, and wherein the first member comprises a first rear portion fitted into the heating unit bracket, and the second member comprises a second rear portion fitted into the heating unit bracket.

4. The oven of claim 2, wherein the support member extends across the first member and the second member, and is coupled to the first member and the second member.

5. The oven of claim 4, wherein the plurality of mounting portions are disposed inward of the first member, and wherein at least a portion of the second member is disposed between the plurality of mounting portions.

6. The oven of claim 2, wherein the heating unit further comprises a fixing member that extends in one direction and is in contact with at least one of the first member or the second member.

7. The oven of claim 6, wherein the fixing member comprises:

a first fixing member that is disposed at rear portions of the first member and the second member and extends in a first horizontal direction;

a second fixing member that extends in a second horizontal direction crossing the first horizontal direction and is disposed adjacent to the first fixing member, the second fixing member connecting the first member and the second member to each other;

a third fixing member that is disposed forward relative to the first fixing member and the second fixing member, the third fixing member connecting one side of the second member to another side of the second member; and a fourth fixing member that extends in the second horizontal direction and is disposed at front portions of the first member and the second member.

8. The oven of claim 1, further comprising a forming part that protrudes upward from the upper frame and accommodates the plurality of antennas therein, the forming part covering the plurality of antennas from the cooking space.

9. The oven of claim 8, wherein the heating unit is disposed between the forming part and the cooking space.

10. The oven of claim 8, wherein the forming part comprises:

a recessed portion that defines an accommodation space receiving the plurality of antennas; and a cover portion that is disposed at the upper frame and covers the recessed portion.

11. The oven of claim 1, wherein the plurality of antennas are spaced apart from one another by a predetermined distance.

12. The oven of claim 8, wherein the forming part comprises a plurality of forming parts that accommodate the plurality of antennas, respectively.

13. The oven of claim 10, wherein the recessed portion is integrally formed with the upper frame.

14. The oven of claim 10, wherein the recessed portion has a rectangular box shape that protrudes upward from the upper frame to define the accommodation space therein having a predetermined depth.

15. The oven of claim 10, wherein an outer surface of the cover portion defines at least a portion of the upper frame.

16. The oven of claim 1, wherein the radiating portion extends along a lengthwise direction, and comprises a plurality of portions that are curved or bent to define a predetermined angle with respect to the lengthwise direction.

17. The oven of claim 1, wherein the heating unit is spaced apart from the upper wall and disposed inside the cooking space, and wherein the plurality of antennas are disposed vertically above the heating unit.

* * * * *